United States Patent
DePiazza et al.

(10) Patent No.: US 6,799,668 B2
(45) Date of Patent: Oct. 5, 2004

(54) MULTI-RATIO CLUTCH

(75) Inventors: David R. DePiazza, Laurinburg, NC (US); Ronald B. Morford, Southern Pines, NC (US); Muneer Abu Samra, Southern Pines, NC (US)

(73) Assignee: ZF Sachs AG, Schweinfurt (DE)

( * ) Notice: Subject to any disclaimer, the term of this patent is extended or adjusted under 35 U.S.C. 154(b) by 0 days.

(21) Appl. No.: 09/832,674

(22) Filed: Apr. 11, 2001

(65) Prior Publication Data

US 2002/0148698 A1 Oct. 17, 2002

(51) Int. Cl.⁷ ............................ F16D 13/50; F16D 13/71
(52) U.S. Cl. ............................. 192/70.29; 192/89.24; 192/99 A
(58) Field of Search ............................. 192/70.29, 70.3, 192/89.24, 98, 99 A

(56) References Cited

U.S. PATENT DOCUMENTS

| | | | |
|---|---|---|---|
| 4,754,860 A | * 7/1988 | Fukutake et al. | .... 192/89.24 X |
| 4,940,126 A | * 7/1990 | Flotow et al. | ........... 192/89.24 |
| 5,373,927 A | * 12/1994 | Gochenour et al. | ........ 192/70.3 |
| 5,979,629 A | * 11/1999 | Asada et al. | .......... 192/99 A X |
| 6,029,790 A | * 2/2000 | Liu et al. | ....................... 192/98 |

* cited by examiner

Primary Examiner—Richard M. Lorence
(74) Attorney, Agent, or Firm—Cohen, Pontani, Lieberman & Pavane

(57) ABSTRACT

An improved clutch has a distinct force ratio for holding than it does for release. A distinct ratio is achieved by having an abutment surface between a retainer and a diaphragm spring be positioned radially outward from a contact location between a release sleeve and the diaphragm spring for releasing the clutch. The retainer is separately axially movable relative to the release sleeve, and surrounds the release sleeve. In this way, the holding force is applied at a lever distance from an axial center line of the clutch which is greater than the distance to the point of contact for release of the diaphragm spring. This provides both a higher holding force and yet a lower release force.

6 Claims, 1 Drawing Sheet

MULTI-RATIO CLUTCH

BACKGROUND OF THE INVENTION

This invention relates to a clutch having a higher holding force and a lower release force through the use of distinct ratios for holding and release force.

Clutches are utilized to selectively transmit or release rotational drive between components in a vehicle driveline. Typically, a clutch is positioned between a vehicle engine and a vehicle transmission. In known clutches, an element is selectively biased against a pressure plate to force the pressure plate to squeeze at least two interleaved disks. One of the disks is connected to rotate with a shaft to be driven and the other disk is fixed to rotate with a clutch cover. The clutch cover is typically connected to the engine to be driven.

In the prior art clutch, a retainer member is connected to move with a release sleeve by a generally conical inner flange on the release sleeve. The retainer rotates with the clutch cover, and thus is able to rotate relative to the sleeve, however, upon axial movement of the sleeve, the retainer typically also moves.

In the prior art clutch a component known as a diaphragm spring forces the retainer in a direction such that it pivots a series of levers to force the pressure plate to squeeze the disks. The diaphragm spring is biased towards a relaxed position, and in trying to move towards its relaxed position its contacts abutment surface on the retainer forcing the retainer to the engaged position at which it causes the levers to hold the pressure plates to squeeze the disks.

When it is desired to release the clutch, the release sleeve is moved to pull the diaphragm spring in a direction allowing the retainer to move away from the engaged position. In the prior art, the point of communication of force from the diaphragm spring holding the retainer in its locked position and point of contact between the retainer and the diaphragm spring are the same.

It would be desirable to have a holding force which is high, and a release force which is low. These two desires have resulted in trade-offs between optimum forces for the two.

SUMMARY OF THE INVENTION

In a disclosed embodiment of this invention, the point of contact between the diaphragm spring and the release member is distinct from the point of contact of the diaphragm spring and the retainer biasing the retainer to its holding position. In this way, a large holding force can be created with a much lower release force.

While this application may refer to "point" of contact, of course the contact is actually over a surface area. When the application claims use the terms "point" or "surface" of contact, this should not be read as limiting in any fashion, and would be met by a line contact or a cross-sectional area contact, or other contacts.

In a preferred embodiment the retainer member is connected to be positioned separate from the release sleeve. The release sleeve contacts a radially inner part of the diaphragm spring, and causes the diaphragm spring to be pulled to the release position. When the diaphragm spring is pulled to its release position it also pulls the retainer to the released position. The connection between the diaphragm spring and the release sleeve being at the radially inner end of the diaphragm spring results in a relatively low release force.

However, the connection between the retainer and the diaphagm spring is spaced radially outward from the release point of contact. In this fashion, a multiplier effect from the diaphragm spring force is achieved. The holding force is thus much greater than the release force.

The retainer being separately movable relative to the release sleeve facilitates this benefit.

These and other features of the present invention can be best understood from the following specification and drawings, the following of which is a brief description.

DETAILED DESCRIPTION OF A PREFERRED EMBODIMENT

Figure 1:
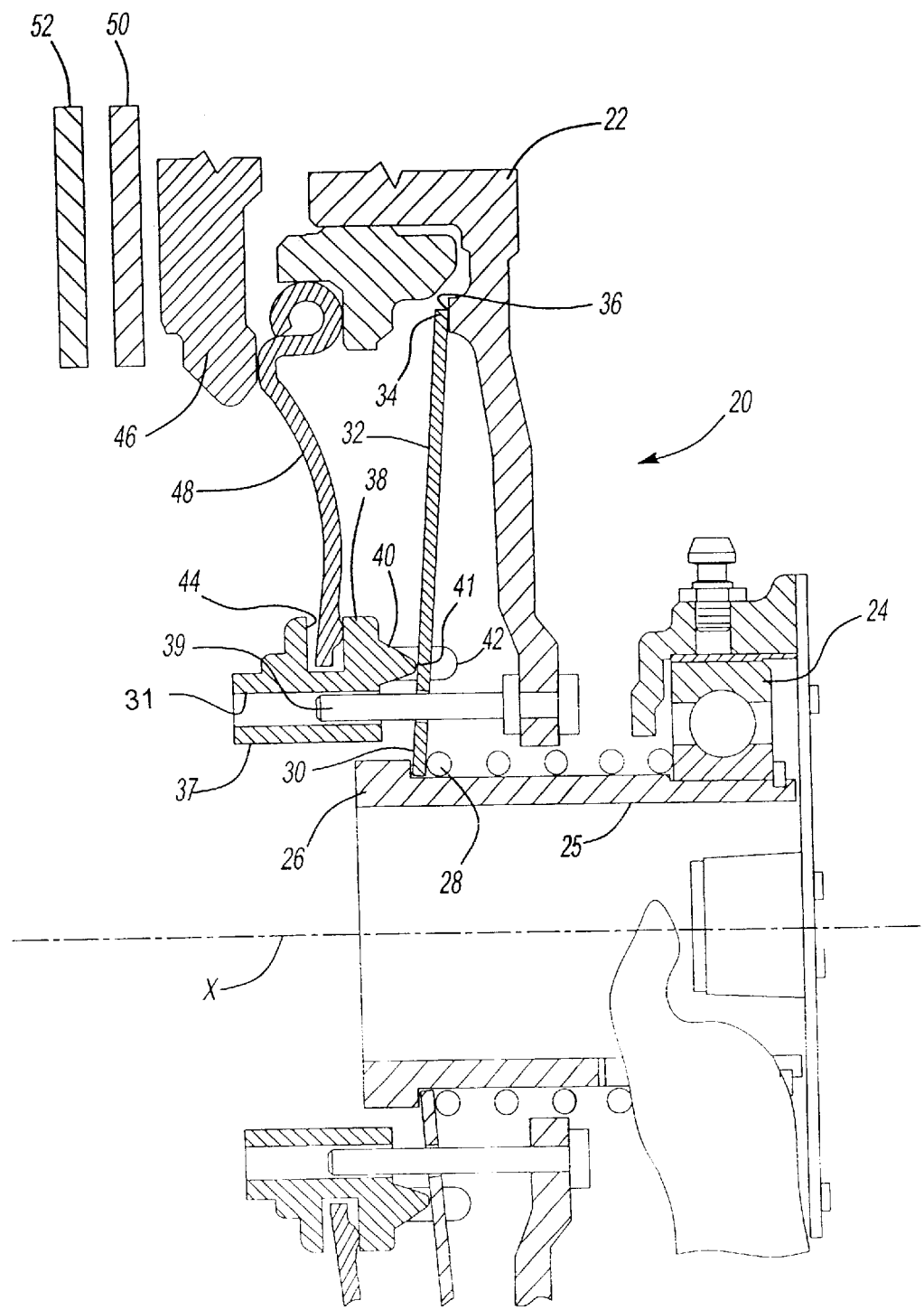
FIG. 1 is a cross-sectional view to an inventive clutch, shown somewhat schematically.

A clutch 20 is illustrated in FIG. 1 having a clutch cover 22 to be driven such as by an engine. A release bearing 24 is connected to a release sleeve 25. The release sleeve 25 has a step 26 at an axially inner end. A coil spring 28 is biased between the bearing 24 and an inner end 30 of a diaphragm spring 32. The spring 28 holds the step 26 against the inner end 30 of the diaphragm spring 32 when the release sleeve is not being pulled to its release position.

An outer end 34 of the diaphragm spring 32 fits against an abutment surface 36 on the clutch cover 22. A retainer member 38 is positioned radially outwardly of the release sleeve 25. An inner diameter 37 of the retainer is shown to be greater than an outer diameter of the step 26 such that the release sleeve 25 moves independently of the retainer 38. A pin 39 extends through a bore 31 in the retainer ensuring that the retainer 38 rotates with the clutch cover 22.

An abutment surface 40 on the retainer engages the diaphragm spring 32 at 41. A connection member 42 is shown schematically, and will allow limited axial movement between the retainer 38 and the diaphragm spring 32, but ensure that when the diaphragm spring 32 is driven to the right as shown in FIG. 1, it brings retainer 38 along. A worker in this art would recognize how to connect the two in such a fashion such as through straps, etc., as are known for other applications.

A groove 44 in the retainer 38 receives a lever 48 which engages a pressure plate 46. As known, in the illustrated position, the diaphragm spring 32 is held away from its relaxed position. It thus applies a force tending to move surface 40 towards the left as shown in FIG. 1. This causes pivoting movement of the lever 48 to the illustrated position. In the illustrated position the pressure plate 46 is caused to clamp the disks 50 and 52 which are connected to rotate with the clutch cover and a shaft to be driven, as known.

Inventive aspects of this invention include the positioning of abutment surface 40 outwardly, the use of a surface 26 on the sleeve 25 for release contact, and the fact that the retainer 38 is separate from the release sleeve 25. When the clutch is driven to its engaged position such as is illustrated, a force is applied from point 41 through abutment surface 40. This force is relatively great in that the distance outwardly from an axial center line X of the clutch serves to multiply the force compared to the force that would be applied at a radially inner end of the diaphragm spring 32. On the other hand, the release force only need overcome the force at the radially inner end 30 of the diaphragm spring 32. When it is desired to release the clutch, the release sleeve 25 is moved to the right from the illustrated position. The step 26 pulls the diaphragm spring 30 to the right. The connection 42 will cause the retainer 38 to also move to the right. This will relax the force from the pressure plate 46 allowing the disks 50 and 52 to move out of engagement.

The present invention thus provides two distinct force ratios with the same basic structure. A designer of clutches is now able to better optimize a clutch by providing a relatively high holding force with a relatively low release force.

Although a preferred embodiment of this invention has been disclosed, a worker in this art would recognize that certain modifications would come within the scope of this invention. For that reason the following claims should be studied.

What is claimed is:

1. A clutch comprising:
   a release sleeve axially movable along an axis of rotation;
   a clutch cover to be driven for rotation about said axis of rotation;
   a pressure plate for rotation with said clutch cover;
   at least one disk, engageable with said pressure plate;
   a retainer member, said retainer member being attached for rotation with said clutch cover;
   an abutment surface located on said retainer member;
   a diaphragm spring for applying a holding force to said retainer member at said abutment surface;
   at least one lever connected to said retainer member for selectively applying a force against said pressure plate;
   said at least one lever causing said disk to be operably connected to said clutch cover via said pressure plate;
   said retainer member being movable to a release position at which said at least one lever allows said pressure plate to move to a disengaged position at which said disk does not rotate with said clutch cover;
   otherwise said diaphragm spring biasing said retainer member to an engaged position;
   a release surface located on said release sleeve for selectively moving said diaphragm spring to a position at which said retainer member can move to said disengaged position, said release surface being positioned radially inward from said abutment surface;
   wherein said retainer member is separately axially movable relative to said release sleeve.

2. A clutch as recited in claim 1, wherein said release sleeve further comprises:
   an axially inner step contacting a radially inner end of said diaphragm spring; and
   a coil spring causing said step to be in contact with said radially inner end of said diaphragm spring.

3. A clutch as recited in claim 2, wherein a radially intermediate portion of said diaphragm spring is structured to contact said abutment surface on said retainer member, and forces said retainer member to said engaged position.

4. A clutch as recited in claim 2, wherein an inner peripheral bore on said retainer member has a greater inner diameter than an outer diameter of said step on said release sleeve such that said release sleeve can move within said bore on said retainer member.

5. A clutch as recited in claim 1, wherein said retainer member is connected for limited axial movement relative to said diaphragm spring.

6. A clutch comprising:
   a release sleeve axially movable along an axis of rotation;
   a clutch cover to be driven for rotation about said axis of rotation;
   a pressure plate for rotation with said clutch cover;
   at least one disk, engageable with said pressure plate;
   a retainer member being attached for rotation with said clutch cover;
   an abutment surface located on said retainer member;
   a diaphragm spring for applying a holding force to said retainer member at an abutment surface;
   a plurality of levers connected to said retainer member for selectively applying a force against said pressure plate causing said disk to be operably connected to said clutch cover,
   said retainer member being movable to a release position at which said plurality of levers allow said pressure plate to move to a disengaged position at which said disk does not rotate with said clutch cover;
   otherwise said diaphragm spring biasing said retainer member to an engaged position;
   a release surface located on said release sleeve for selectively moving said diaphragm spring to a position at which said retainer member can move to said disengaged position, said release surface being positioned radially inward from said first abutment surface; and
   said retainer member being separately axially movable relative to said release sleeve;
   said retainer member being connected for limited axial movement relative to said diaphragm spring, and;
   said release sleeve further comprising an axially inner step contacting a radially inner end of said diaphragm spring, and having a coil spring causing said step to be in contact with said radially inner end of said diaphragm spring;
   a radially intermediate portion of said diaphragm spring structured for contacting said abutment surface on said retainer member, and forcing said retainer member to said engaged position; and
   an inner peripheral bore of said retainer member having a greater inner diameter than an outer diameter of said step of said release sleeve such that said release sleeve can move within said bore on said retainer member.

* * * * *